United States Patent
Shin et al.

(10) Patent No.: US 11,724,659 B2
(45) Date of Patent: Aug. 15, 2023

(54) KNEE AIR BAG AND CONTROL METHOD OF DEPLOYING THE SAME

(71) Applicants: Hyundai Motor Company, Seoul (KR); Kia Corporation, Seoul (KR)

(72) Inventors: Hyo Shub Shin, Seoul (KR); Yu Ji Son, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/510,762

(22) Filed: Oct. 26, 2021

(65) Prior Publication Data

US 2022/0332276 A1 Oct. 20, 2022

(30) Foreign Application Priority Data

Apr. 15, 2021 (KR) .................. 10-2021-0048912

(51) Int. Cl.
*B60R 21/206* (2011.01)
*B60R 21/231* (2011.01)

(52) U.S. Cl.
CPC .. *B60R 21/206* (2013.01); *B60R 2021/23107* (2013.01); *B60R 2021/23169* (2013.01)

(58) Field of Classification Search
CPC ........ B60R 21/01512; B60R 21/01554; B60R 21/205; B60R 21/206; B60R 2021/0032; B60R 2021/01211; B60R 2021/01231; B60R 2021/23107; B60R 2021/23169; B60R 2021/23176

See application file for complete search history.

(56) References Cited

U.S. PATENT DOCUMENTS

| | | | |
|---|---|---|---|
| 5,536,043 A | 7/1996 | Lang et al. | |
| 6,217,059 B1 * | 4/2001 | Brown | B60R 21/16 280/730.2 |
| 7,090,245 B2 * | 8/2006 | Yoshikawa | B60R 21/206 280/729 |
| 7,950,688 B2 * | 5/2011 | Kotikovsky | B60R 21/206 280/732 |
| 9,283,916 B2 | 3/2016 | Nagasawa | |
| 9,487,177 B2 * | 11/2016 | Schneider | B60R 21/206 |
| 10,682,973 B2 * | 6/2020 | Kitagawa | B60R 21/206 |
| 10,988,103 B2 * | 4/2021 | Oh | B60R 21/04 |
| 2003/0015861 A1 | 1/2003 | Abe | |
| 2005/0062262 A1 | 3/2005 | Williams | |

(Continued)

FOREIGN PATENT DOCUMENTS

| | | | | |
|---|---|---|---|---|
| JP | 2015085761 A | * | 5/2015 | |
| JP | 2019172236 A | * | 10/2019 | ........... B60R 21/214 |
| JP | 2020055370 A | * | 4/2020 | |

OTHER PUBLICATIONS

Extended European Search Report dated Apr. 20, 2022 in corresponding European Patent Application No. 21 204 890.4.

*Primary Examiner* — Laura Freedman
(74) *Attorney, Agent, or Firm* — Fox Rothschild LLP

(57) ABSTRACT

A knee air bag reduces an injury to occupant's legs by employing a slim crash pad design. The air bag includes a first cushion that is deployed from an inner side of a crash pad toward an occupant to fill a space below the crash pad and a second cushion that is deployed between the first cushion and the occupant to support occupant's legs while being supported on the first cushion.

15 Claims, 6 Drawing Sheets

(56) References Cited

U.S. PATENT DOCUMENTS

2006/0232050 A1\* 10/2006 Kumagai .............. B60R 21/231
                                                    280/732
2008/0147278 A1    6/2008 Breed
2020/0130632 A1\*  4/2020 Sekizuka ............. B60R 21/231
2021/0347322 A1\* 11/2021 Freisler ............ B60R 21/01554

\* cited by examiner

SITTING IN REAR REGION
IN NORMAL MODE

SITTING IN FRONT REGION
IN NORMAL MODE

SITTING IN RELAX MODE

KNEE AIR BAG AND CONTROL METHOD OF DEPLOYING THE SAME

CROSS REFERENCE TO RELATED APPLICATION

The present application claims priority of Korean Patent Application No. 10-2021-0048912 filed on Apr. 15, 2021, the entire contents of which is incorporated herein for all purposes by this reference.

BACKGROUND OF THE DISCLOSURE

Field of the Disclosure

The present disclosure relates to a knee air bag for reducing an injury to occupant's legs by employing a slim crash pad design, and a control method of deploying the same.

Description of the Related Art

A knee air bag device is a device in which an air bag cushion is deployed between an instrument panel and an occupant's knee to protect the occupant's knee. In the knee air bag device, an air bag housing is installed inside the instrument panel, and an inflator and an airbag cushion, which are gas generation mechanisms, are accommodated in the air bag housing, and during a collision, a gas generated from the inflator is provided in the air bag cushion, and thus the air bag cushion is deployed upward from a lower end of the instrument panel toward the occupant to protect the occupant's knee.

Meanwhile, recently, as one technique for increasing utilization of an inner space of a vehicle, a crash pad has been designed to be slim. However, since the crash pad is designed to be slim, it is impossible to control the behavior of an occupant's lower body due to the knee air bag thus increasing an injury of the occupant's lower body. In other words, as a distance between the crash pad and the occupant is increased, an air bag protection area for protecting the occupant is increased.

Therefore, it is possible to consider a method of increasing a cushion volume of the knee air bag. However, since there is a problem in that a cushion deployment speed decreases substantially and a cushion may be incorrectly deployed between the occupant's legs, a knee air bag structure that is capable of properly responding to a slim crash pad design is required.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure provides a knee air bag for reducing an injury to occupant's legs by employing a slim crash pad design, and a control method of deploying the same. According to one aspect, a knee air bag may include a first cushion deployed from an inner side of a crash pad toward an occupant to fill a space below the crash pad, and a second cushion deployed between the first cushion and the occupant to support occupant's legs while being supported on the first cushion.

The second cushion may be deployed downward from an end portion of the crash pad facing the occupant. An expanding volume of the first cushion may be greater than an expanding volume of the second cushion. The first cushion may be deployed in a form covering occupant's ankle portions. The knee air bag may further include a seat position sensor configured to detect an attitude of a seat at which the knee air bag is installed, an occupant detection sensor configured to detect a state of the occupant sitting on the seat, and a controller configured to execute deployment operations of the first cushion and the second cushion according to the attitude of the seat and the seating state of the occupant.

When the seat is located in a rear area between a middle region and a rearmost region and an adult occupant sits on the seat in a normal mode, the controller may be configured to deploy the first cushion and then deploy the second cushion. When the seat is located in a front area between a front most region and the middle region and the adult occupant sits on the seat in the normal mode, the controller may be configured to deploy the first cushion and not deploy the second cushion.

A gas pressure for deploying the first cushion may be differently determined according to a position of the seat. When the adult occupant sits on the seat in a relax mode, the controller may be configured to deploy the second cushion and then deploy the first cushion. When the seat is positioned in a rotated state, the controller may be configured to deploy the second cushion and then deploy the first cushion. After the deployment of the first cushion or the second cushion, a driver seat air bag or a passenger seat air bag may be deployed. When the seat is located in a front most region and a child occupant sits on the seat, the controller may be configured to deploy the first cushion at a low pressure and not deploy the second cushion. After the deployment of the first cushion, whether to deploy a passenger seat air bag may be determined according to a vehicle speed. The second cushion may be mounted inside an end portion of the crash pad.

According to another aspect, a control method of deploying a knee air bag, may include a seat position securing operation of securing, by a controller, an attitude of a seat at which the knee air bag is installed; a passenger state securing operation of securing, by the controller, a state of an occupant sitting on the seat; and a cushion control operation of executing, by the controller, deployment operations of a first cushion and a second cushion according to the attitude of the seat and the seating state of the occupant.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Exemplary embodiments of the present disclosure will be described below with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
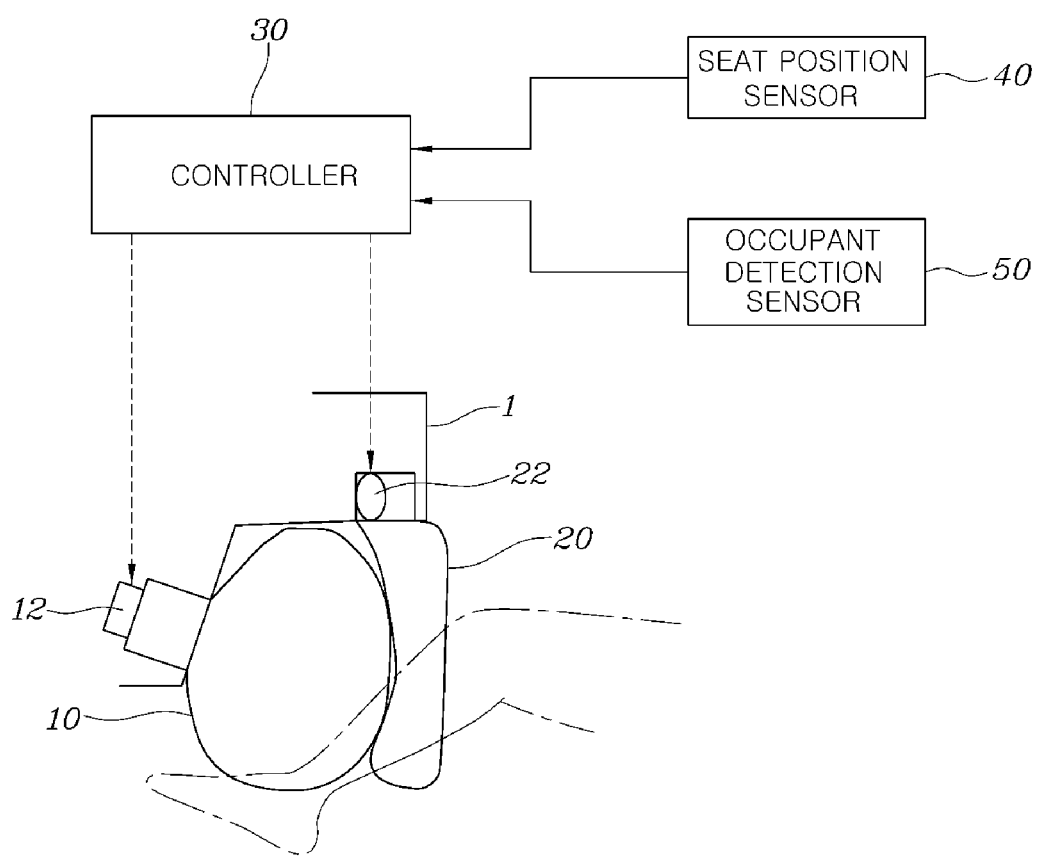
FIG. 1 is a diagram illustrating a knee air bag and a deployment shape thereof according to the present disclosure.

FIG. 1 is a diagram illustrating a knee air bag and a deployment shape thereof according to the present disclosure. For reference, the knee air bag is applicable to a slim crash pad 1, and the crash pad 1 may be implemented in an electric vehicle (EV) in which an air conditioning module disposed in the existing engine room.

Referring to the drawing, the knee air bag of the present disclosure may include a first cushion 10 deployed toward an occupant inside the crash pad 1 to fill a space below the crash pad 1, and a second cushion 20 deployed between the first cushion 10 and the occupant and supported on the first cushion 10 to support occupant's legs. Specifically, the first cushion 10 may be mounted on an inner surface of the slim crash pad 1 to be deployed in a direction of the occupant, thereby filling a space below the crash pad 1 and serving to support the second cushion 20. For example, according to the structure of the slim crash pad, the distance between the crash pad 1 and the occupant's knee may be 500 mm or more.

In addition, the second cushion 20 may be mounted on an upper end of the slim crash pad 1 and deployed between the first cushion 10 and the occupant's legs so that a front surface of the second cushion 20 is supported on the first cushion 10 during deployment, thereby confining the occupant's lower body to reduce an injury. However, depending on a seat position and an occupant sitting condition, only the first cushion 10 may be deployed and the second cushion 20 may not be deployed. In particular, the first cushion 10 confines the occupant's legs. In other words, when a knee air bag operation signal is applied according to a collision of the vehicle, the first cushion 10 may be deployed to fill the space below the slim crash pad 1, and the second cushion 20 may be deployed between the first cushion 10 and the occupant's legs.

Therefore, the cushion may be rapidly and accurately deployed to fill the space below the slim crash pad 1, which is relatively greater than the existing space, and a distance between the cushion and the occupant may be maintained at an appropriate distance (e.g., 200 mm or less). Thus, a behavior of the occupant's lower body may be controlled to reduce an injury to the occupant's lower body. In addition, the second cushion 20 may be mounted inside an end portion of the crash pad 1. Accordingly, the second cushion 20 may be deployed downward from the end portion of the crash pad 1 toward the occupant.

In other words, an inflator 22 together with the second cushion 20 may be installed inside the upper end of the crash pad 1 covering the space below the crash pad 1. Accordingly, a gas of the inflator 22 may be supplied into the second cushion 20 and the second cushion 20 may be vertically deployed downward from a horizontal surface at a distal end of the crash pad 1 so that the second cushion 20 is deployed at a position close or proximate to the occupant's legs to rapidly confine the occupant's lower body. For reference, the inflator 12 together with the first cushion 10 may be installed on an inner side of the crash pad 1 covering the space below the crash pad 1 so that the gas of the inflator 12 may be supplied into the first cushion 10 to deploy the first cushion 10.

In addition, the first cushion 10 may have an expanding volume that is greater than an expanding volume of the second cushion 20. For example, the first cushion 10 may have a size of an air bag cushion used in the existing driver seat air bag at a level ranging from about 50 L to 60 L, and the second cushion 20 may have a size of an air bag cushion used in the existing knee air bag at a level of about 20 L. In other words, since a volume of the first cushion 10 expands to be greater than a volume of the second cushion 20, the space below the crash pad 1 may be stably filled with the first cushion 10. In addition, the first cushion 10 may be deployed in the form that covers occupant's ankle portions. For example, since the first cushion 10 is deployed from a driver's seat to the occupant's ankle portions, wherein the occupant drives the vehicle, the occupant's ankle portions are protected by the first cushion 10, and thus the risk of a torsion injury of the occupant's ankle portions is reduced.

Meanwhile, the present disclosure may further include a seat position sensor 40 configured to detect an attitude of a seat at which the knee air bag is installed, an occupant detection sensor 50 configured to detect a state of an occupant sitting on the seat; and a controller 30 configured to execute and adjust deployment operations of the first cushion 10 and the second cushion 20 according to the attitude of the seat and a sitting state of the occupant. For example, the seat position sensor 40 may be configured to detect a position of the seat in a seat sliding area in which the seat slides forward and backward and, in the case of a swivel seat, the seat position sensor 40 may be configured to detect a swivel direction and a swivel angle of the swivel seat.

In addition, the occupant detection sensor 50 may be configured to detect a posture of the occupant sitting on the seat and determine the posture of the occupant sitting on the seat and whether a child occupant is seated on the seat through a seatback angle sensor configured to measure an angle of a seatback and a vision sensor inside the vehicle. In particular, when signals detected by the seat position sensor 40 and the occupant detection sensor 50 are input to the controller 30, the controller 30 may be configured to apply operation signals to the first cushion 10 and the second cushion 20 based on the input signals to change a deployment time, a deployment pressure, and a deployment order of the first cushion 10 and the second cushion 20, thereby controlling the deployment operations of the first cushion 10 and the second cushion 20.

For reference, the controller 30 according to an exemplary embodiment of the present disclosure may be implemented through an algorithm configured to control operations of various components of the vehicle, a non-volatile memory (not shown) configured to store data relating to software commands to reproduce the algorithm, or a processor (not shown) configured to perform operations, which will be described below, using data stored in a corresponding memory. Here, the memory and the processor may be implemented as separate chips. Alternatively, the memory and the processor may be implemented as a single chip in which the memory and the processor are integrated. The processor may be in the form of one or more processors.

Meanwhile, a control method of deploying a knee air bag according to the present disclosure may include a seat position securing operation of securing, by the controller 30, an attitude of a seat at which a knee air bag is installed; an occupant state securing operation of securing, by the controller 30, a state of the occupant sitting on the seat; and a cushion control operation of executing and adjusting, by the controller 30, deployment operations of the first cushion 10 and the second cushion 20 according to the attitude of the seat and the seating state of the occupant.

Figure 2:
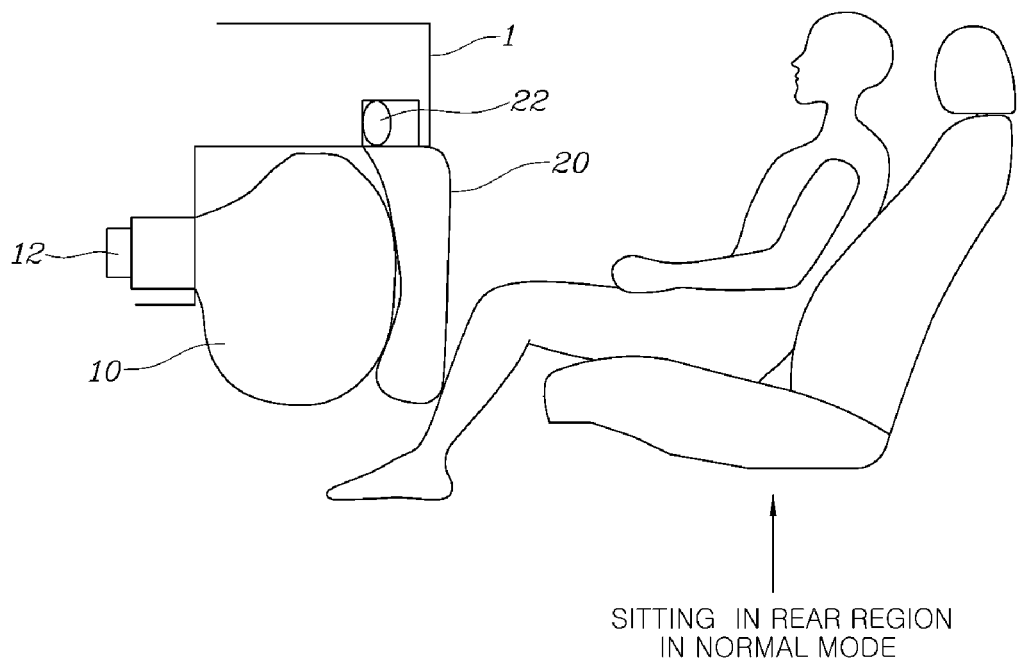
FIGS. 2 to 6 are diagrams for describing an operation of the knee air bag which is deployed depending on a seat and an occupant condition according to the present disclosure.

FIG. 2 is a diagram for describing an operation in which the knee air bag is deployed according to a first condition depending on the seat and an occupant position in the present disclosure. Referring to the drawing, when the seat is located in a rear area between a middle region and a rearmost region and an adult occupant sits on the seat in a normal mode, the controller 30 may be configured to deploy the first cushion 10 and then deploy the second cushion 20. The normal mode may be a mode in which the occupant sits in a state in which an angle of a seatback is inclined at an angle ranging from about 20° to about 40°.

In other words, when a collision occurs in a state in which a position of the seat is located in the rear region toward a rear side of the vehicle of the entirety of the seat sliding area and the seat is not reclined significantly, the first cushion 10 may be deployed first and then the second cushion 20 may be deployed after a certain period of time. Therefore, the occupant's legs are confined by the second cushion 20 to prevent the risk of injury to the occupant's lower body. In addition, after the deployment of the second cushion 20, since a driver seat air bag is deployed to a driver's seat, and a passenger seat air bag is deployed to a passenger's seat, a driver sitting on the driver's seat is further safely protected.

Figure 3:
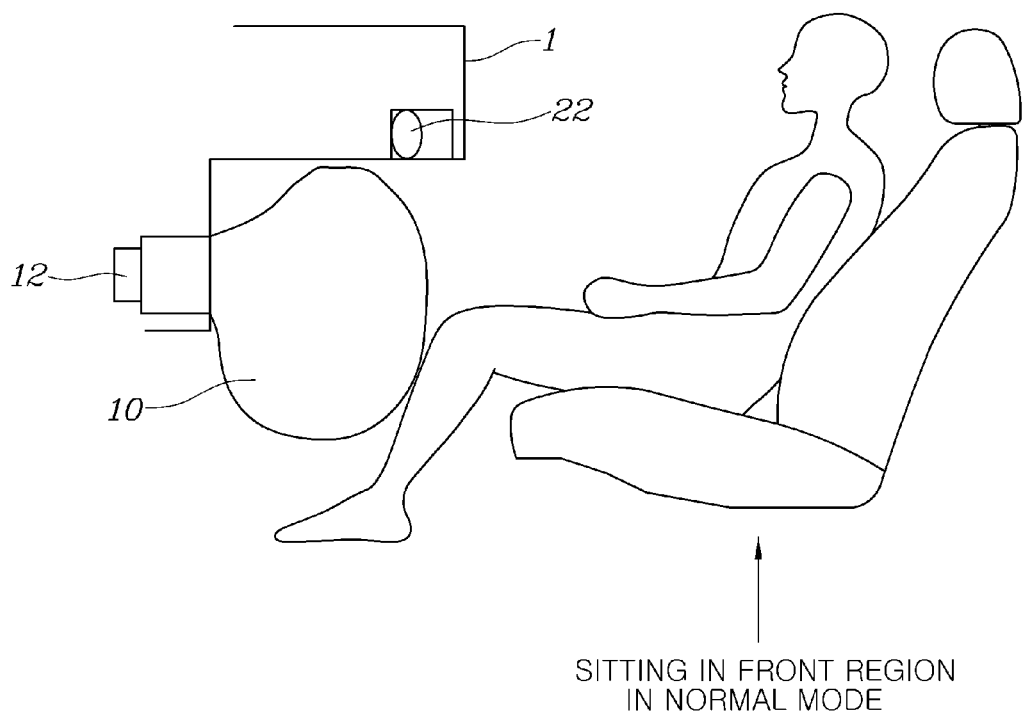

FIG. 3 is a diagram for describing an operation in which the knee air bag is deployed according to a second condition depending on the seat and the occupant position in the present disclosure. Referring to the drawing, when the seat is located in a front area between a front most region and a middle region and the adult occupant sits on the seat in the normal mode, the controller 30 may be configured to deploy the first cushion 10 and not deploy the second cushion 20.

In other words, when a collision occurs in a state in which a position of the seat is located in a front region toward a front side of the vehicle of the entirety of the seat sliding area and the seat is not reclined significantly, the first cushion 10 may be deployed and the second cushion 20 is not deployed. This is because the occupant's legs are relatively located close to the front side of the vehicle, and when the vehicle collides, the occupant's legs are loaded onto the first cushion 10 before the second cushion 20 is deployed. Therefore, even when the second cushion 20 is not deployed, the occupant's legs are confined by the first cushion 10 thus preventing the risk of injury to the occupant's lower body.

In addition, after the deployment of the first cushion 10, since the driver seat air bag is deployed to the driver's seat, and the passenger seat air bag is deployed to the passenger's seat, the driver sitting on the driver's seat is further safely protected. In the case of the second condition, a gas pressure for deploying the first cushion 10 may be determined differently according to the position of the seat. For example, as the position of the seat is located to be closer to the front side of the vehicle, the gas pressure for deploying the first cushion 10 may be set to be smaller than a predetermined reference gas pressure, whereas, as the position of the seat is located to be closer to the rear side of the vehicle, the gas pressure for deploying the first cushion 10 may be set to be larger than the predetermined reference gas pressure.

Figure 4:
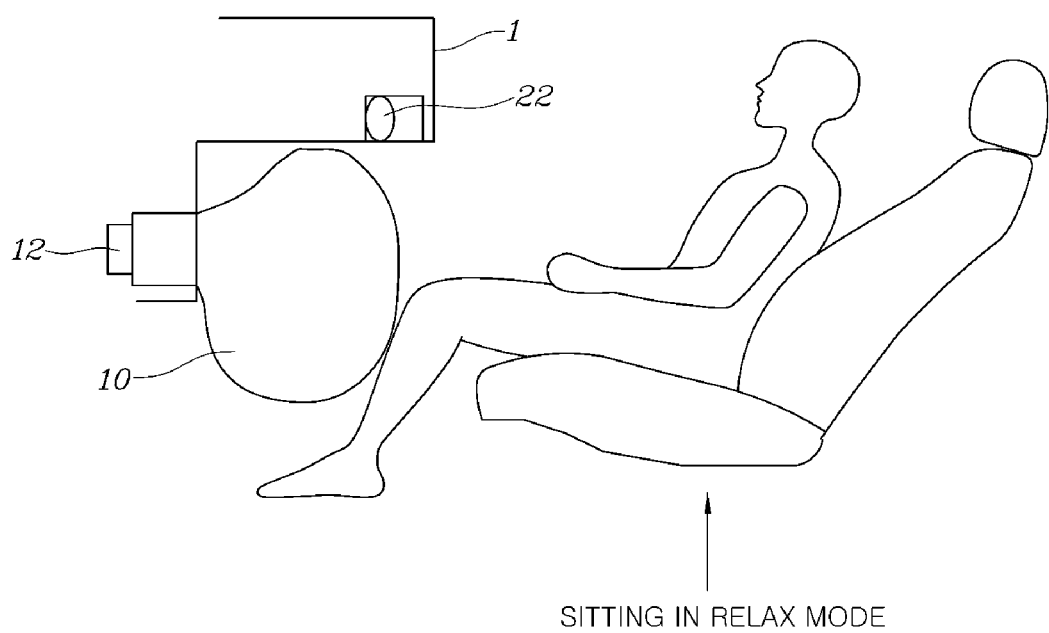

FIG. 4 is a diagram for describing an operation in which the knee air bag is deployed according to a third condition depending on the seat and the occupant position in the present disclosure. Referring to the drawing, when the adult occupant sits on the seat in a relax mode, the controller 30 may be configured to deploy the first cushion 10 and not deploy the second cushion 20.

Particularly, the relax mode may be a mode in which the occupant sits in a state in which the angle of the seatback is inclined at an angle exceeding about 40°. In other words, when a collision occurs in a state in which the position of the seat is located in the rear region toward the rear side of the vehicle of the entirety of the seat sliding area and the seat is reclined significantly, the second cushion 20 may be deployed first and then the first cushion 10 may be deployed after a certain period of time. Therefore, occupant's knee portions are confined by the second cushion 20 and the occupant's ankle portions are confined by the first cushion 10 thus preventing the risk of injury to the occupant's lower body. In addition, after the deployment of the first cushion 10, since the driver seat air bag is deployed to the driver's seat, and the passenger seat air bag is deployed to the passenger's seat, the driver sitting on the driver's seat is further safely protected.

Figure 5:
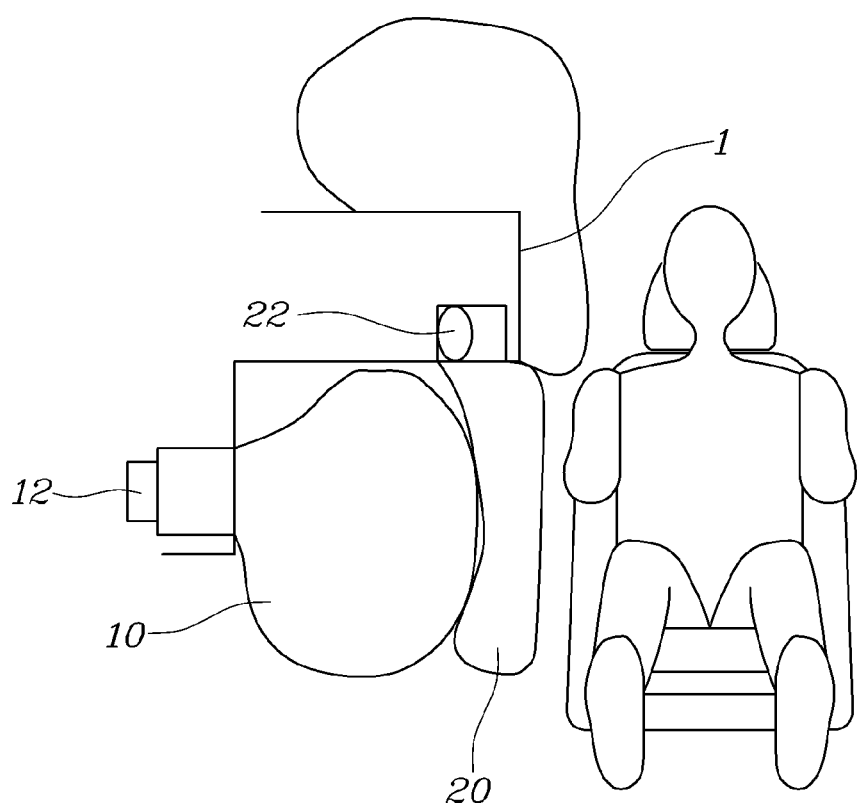

FIG. 5 is a diagram for describing an operation in which the knee air bag is deployed according to a fourth condition depending on the seat and the occupant position in the present disclosure. Referring to the drawing, when the seat is located in a rotated state, the controller 30 may be configured to deploy the second cushion 20 and then deploy the first cushion 10. For example, when a collision occurs in a state in which the seat is swiveled at an angle of 90°, the second cushion 20 may be deployed first, and then the first cushion 10 may be deployed after a certain period of time.

Therefore, side portions of the occupant's lower body are confined by the second cushion 20 to prevent the risk of injury to the occupant's lower body. In addition, after the deployment of the second cushion 20, since the driver seat air bag is deployed to the driver's seat, and the passenger seat air bag is deployed to the passenger's seat, the driver sitting on the driver's seat is further safely protected.

Figure 6:
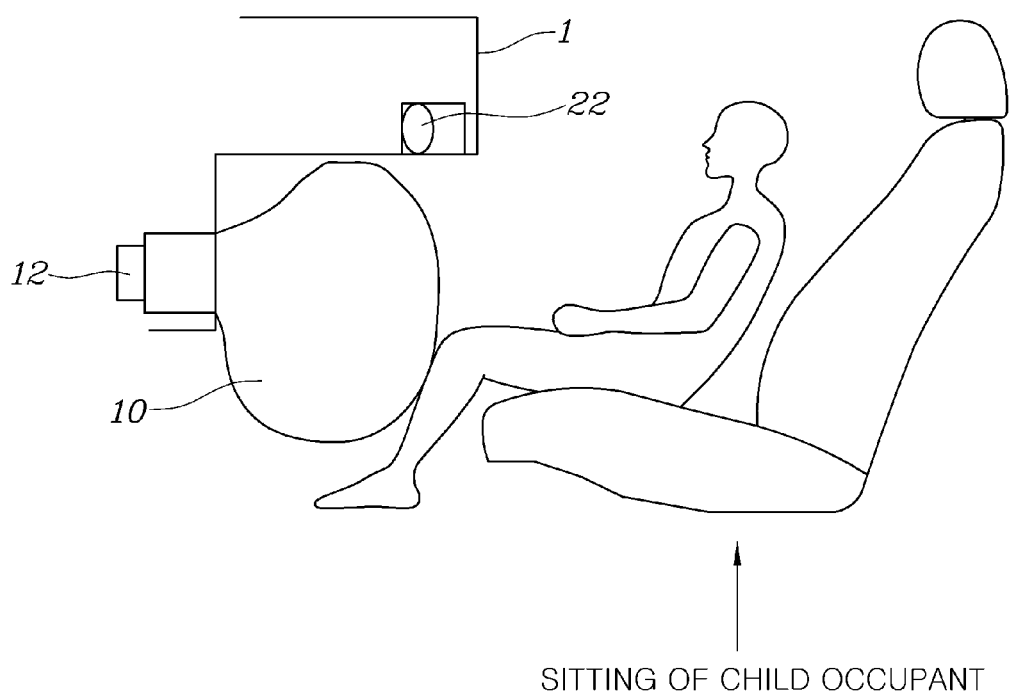

FIG. 6 is a diagram for describing an operation in which the knee air bag is deployed according to a fifth condition depending on the seat and the occupant position in the present disclosure. Referring to the drawing, when the seat is located in the front most region and the child occupant sits on the seat, the controller 30 may be configured to deploy the first cushion 10 at a low pressure and then not deploy the second cushion 20.

In other words, when a collision occurs in a state in which the position of the seat is located in a front most region of the entirety of the seat sliding area and the child occupant is seated on the seat, the first cushion 10 may be deployed at a low pressure and the second cushion 20 is not deployed. This is because the occupant's legs are located relatively close to the front side of the vehicle and the child occupant having a weaker body than the adult occupant sits on the seat, and when the vehicle collides, the occupant's legs are loaded onto the first cushion 10 before the second cushion 20 is deployed. Therefore, since the second cushion 20 is not deployed and only the first cushion 10 is deployed at a low pressure, the occupant's legs are confined by the first cushion 10 thus preventing the risk of injury to a child occupant's lower body. Here, the low pressure is a pressure lower than the pressure of deployment when an adult occupant is seated on the seat.

In addition, in the fifth condition, after the deployment of the first cushion 10, it may be possible to determine whether to deploy the passenger seat air bag according to a vehicle speed. For example, when a collision occurs in a state in which the vehicle speed is higher than a predetermined reference speed, the passenger seat air bag may be deployed to protect the child occupant from a strong impact force. On the other hand, when the crash occurs at a low vehicle speed where the vehicle speed is lower than the predetermined reference speed, since an impact force is relatively small, the passenger seat air bag may be controlled to not be deployed to prevent the risk of injury to the child occupant due to a deployment pressure of the passenger seat air bag.

As described above, according to the present disclosure, when the knee air bag operation signal is applied, the first cushion 10 may be deployed to fill the space below the slim crash pad 1, and the second cushion 20 may be deployed between the first cushion 10 and the occupant's legs. Therefore, the cushion may be rapidly and accurately deployed to fill the space below the slim crash pad 1, which relatively becomes larger, and a distance between the cushion and the occupant is maintained at an appropriate distance. Thus, there is an effect in that a behavior of an occupant's lower body may be controlled to reduce the risk of injury to the occupant's lower body.

Meanwhile, although the present disclosure has been described in detail with respect to only the above described specific examples, it is obvious to those skilled in the art that various modifications and alternations are possible within the technical scope of the present disclosure, and it is natural that such modifications and alternation fall within the appended claims.

What is claimed is:

1. A knee air bag, comprising:
   a first cushion configured to be deployed from an inner side of a crash pad toward an occupant to fill a space below the crash pad;
   a second cushion configured to be deployed between the first cushion and the occupant to support legs of the occupant while being supported on the first cushion;
   a seat position sensor configured to detect an attitude of a seat at which the knee air bag is installed;
   an occupant detection sensor configured to detect a state of the occupant sitting on the seat; and
   a controller configured to control deployment operations of the first cushion and the second cushion according to the attitude of the seat and the sitting state of the occupant;
   wherein the controller is configured to detect the attitude of the seat and the sitting state of the occupant to determine whether the second cushion be deployed or not and a gas pressure for deploying the first cushion.

2. The knee air bag of claim 1, wherein the second cushion is configured to be deployed downward from an end portion of the crash pad facing the occupant.

3. The knee air bag of claim 1, wherein an expanding volume of the first cushion is greater than an expanding volume of the second cushion.

4. The knee air bag of claim 1, wherein the first cushion is configured to be deployed in a form covering ankle portions of the occupant.

5. The knee air bag of claim 1, wherein, when the seat is located in a rear area between a middle region and a rearmost region and an adult occupant sits on the seat in a normal mode, the controller is configured to deploy the first cushion and then deploy the second cushion.

6. The knee air bag of claim 1, wherein, when the seat is located in a front area between a front most region and a middle region and an adult occupant sits on the seat in a normal mode, the controller is configured to deploy the first cushion and not deploy the second cushion.

7. The knee air bag of claim 6, wherein the gas pressure for deploying the first cushion is determined differently according to a position of the seat.

8. The knee air bag of claim 1, wherein, when an adult occupant sits on the seat in a relax mode, the controller is configured to deploy the second cushion and then deploy the first cushion.

9. The knee air bag of claim 1, wherein, when the seat is positioned in a rotated state, the controller is configured to deploy the second cushion and then deploy the first cushion.

10. The knee air bag of claim 1, wherein after the deployment of the first cushion or the second cushion, a driver seat air bag or a passenger seat air bag is deployed.

11. The knee air bag of claim 1, wherein, when the seat is located in a front most region and a child occupant sits on the seat, the controller is configured to deploy the first cushion at a low pressure and not deploy the second cushion.

12. The knee air bag of claim 11, wherein, after the deployment of the first cushion, whether to deploy a passenger seat air bag is determined according to a vehicle speed.

13. The knee air bag of claim 1, wherein the second cushion is mounted inside an end portion of the crash pad.

14. A control method of deploying the knee air bag according to claim 1, the control method comprising:
    securing, by the controller, the attitude of the seat at which the knee air bag is installed;
    securing, by the controller, the state of the occupant sitting on the seat; and
    controlling, by the controller, deployment operations of the first cushion and the second cushion according to the attitude of the seat and the sitting state of the occupant.

15. A knee air bag, comprising:
    a first cushion configured to be deployed from an inner side of a crash pad toward an occupant to fill a space below the crash pad;

a second cushion configured to be deployed between the first cushion and the occupant to support legs of the occupant while being supported on the first cushion; and a controller configured to control deployment operations of the first cushion and the second cushion according to an attitude of a seat and a sitting state of the occupant;

wherein, after the deployment of the first cushion or the second cushion, a driver seat air bag or a passenger seat air bag is deployed.

* * * * *